Feb. 10, 1970     E. THUSE     3,494,377
GATE VALVE MECHANISM FOR CONTROL OF PLURAL PASSAGES
Filed June 12, 1967     6 Sheets-Sheet 1
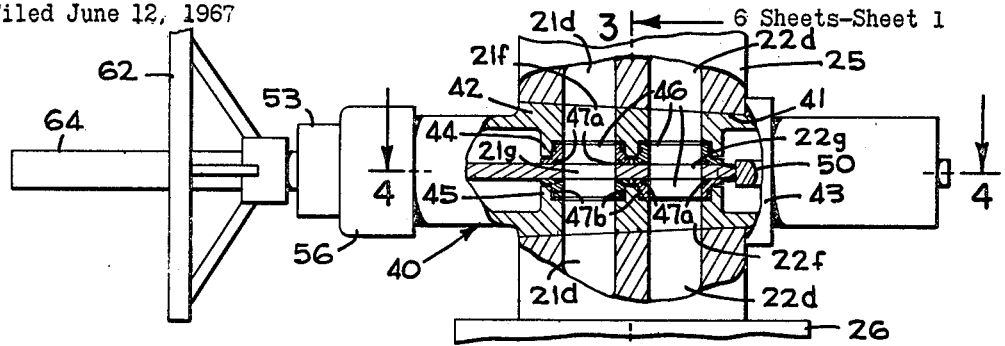
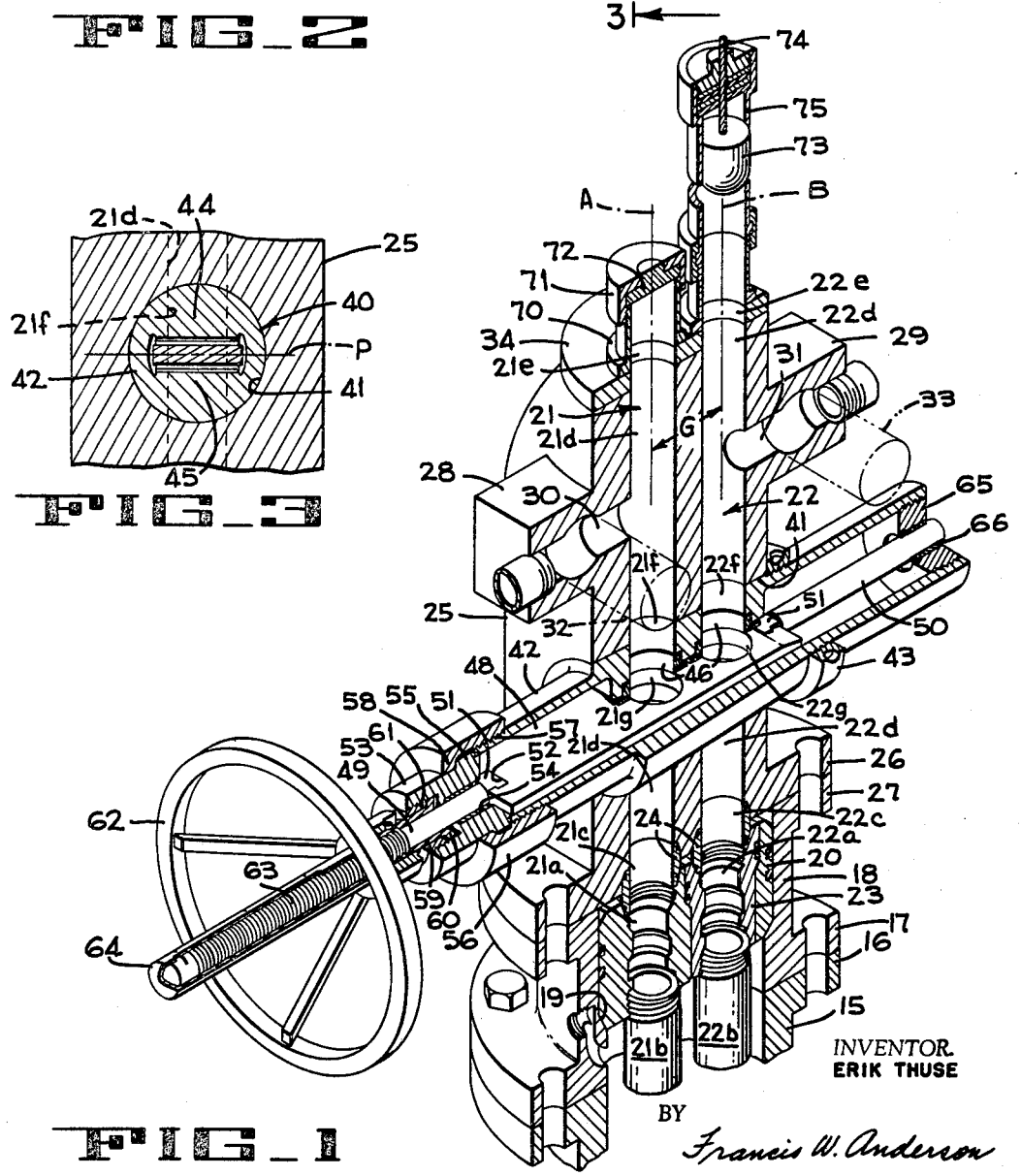
INVENTOR.
ERIK THUSE
BY
Francis W. Anderson
ATTORNEY Feb. 10, 1970 E. THUSE 3,494,377
GATE VALVE MECHANISM FOR CONTROL OF PLURAL PASSAGES
Filed June 12, 1967 6 Sheets-Sheet 2
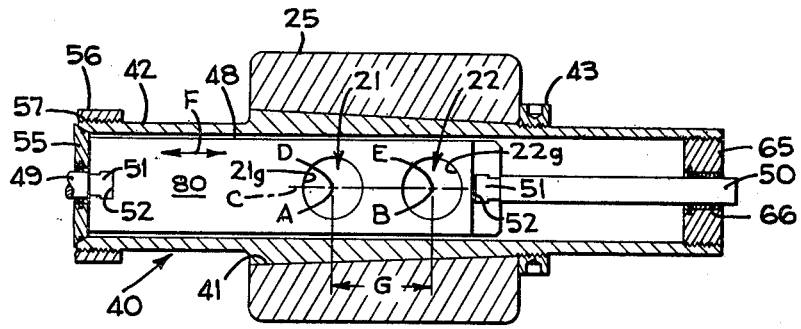
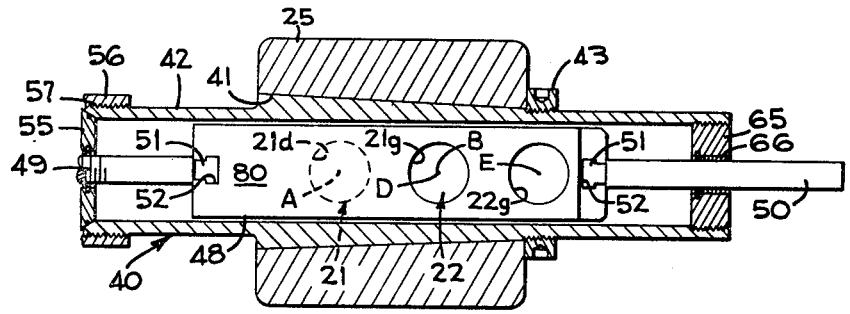
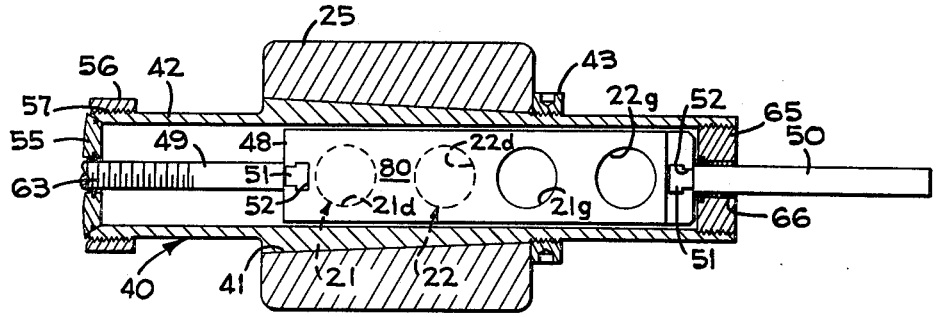
INVENTOR.
ERIK THUSE
BY
*Francis W. Anderson*
ATTORNEY Feb. 10, 1970 E. THUSE 3,494,377
GATE VALVE MECHANISM FOR CONTROL OF PLURAL PASSAGES
Filed June 12, 1967 6 Sheets-Sheet 3
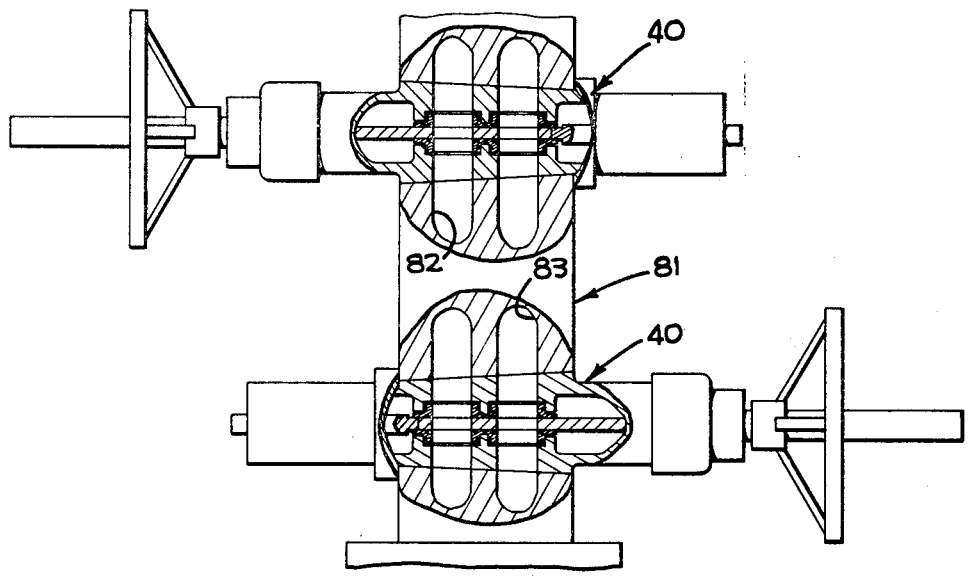
FIG_7
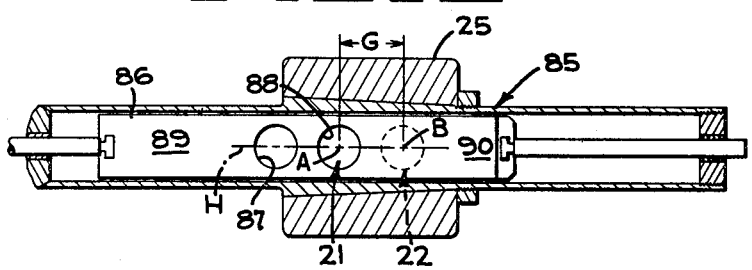
FIG_8
INVENTOR.
ERIK THUSE
BY *Francis W. Anderson*
ATTORNEY

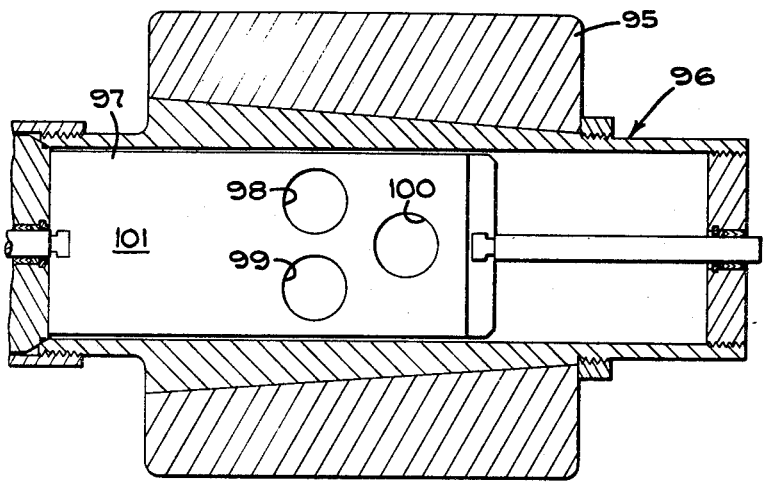
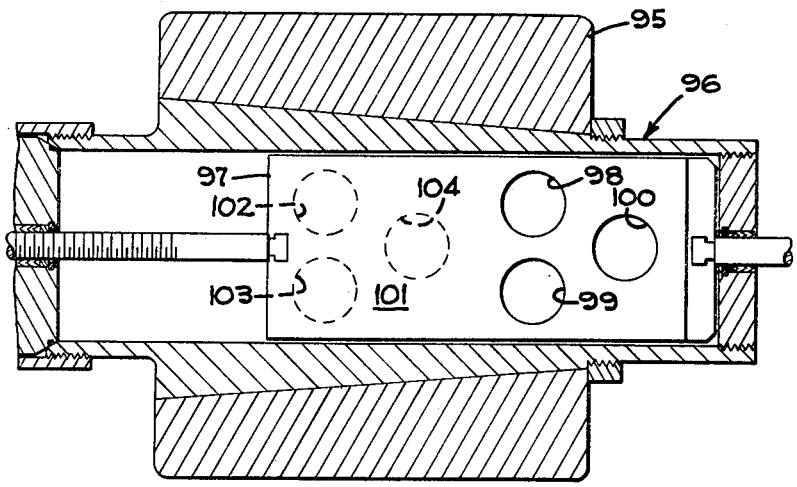

Feb. 10, 1970     E. THUSE     3,494,377
GATE VALVE MECHANISM FOR CONTROL OF PLURAL PASSAGES
Filed June 12, 1967     6 Sheets-Sheet 5
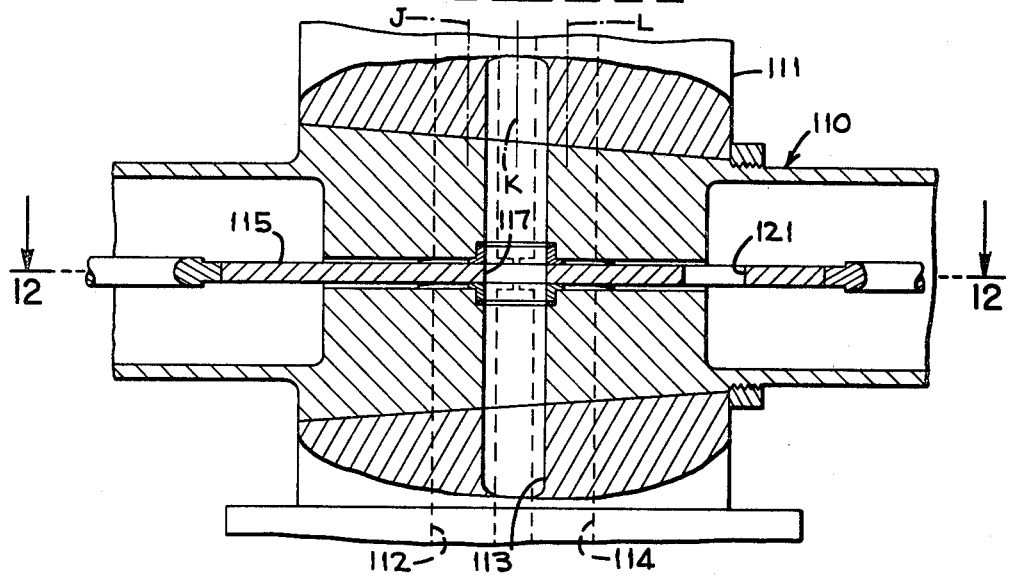
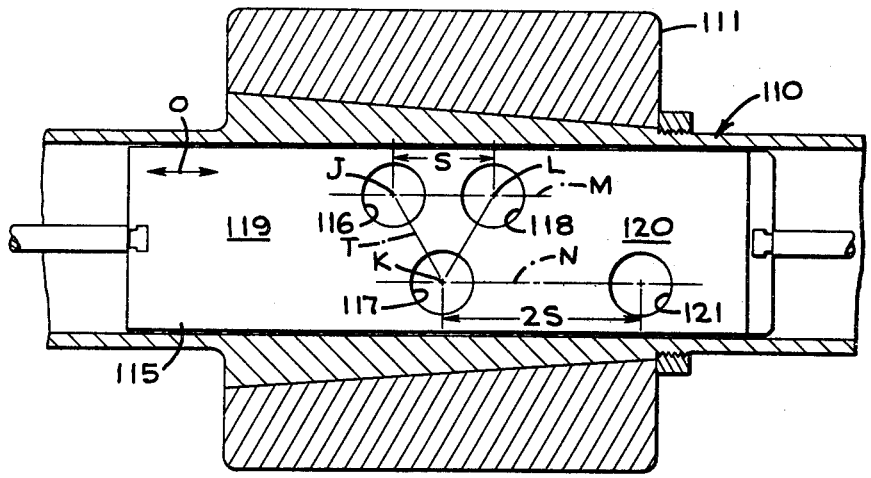
INVENTOR.
ERIK THUSE
BY
*Francis W. Anderson*
ATTORNEY

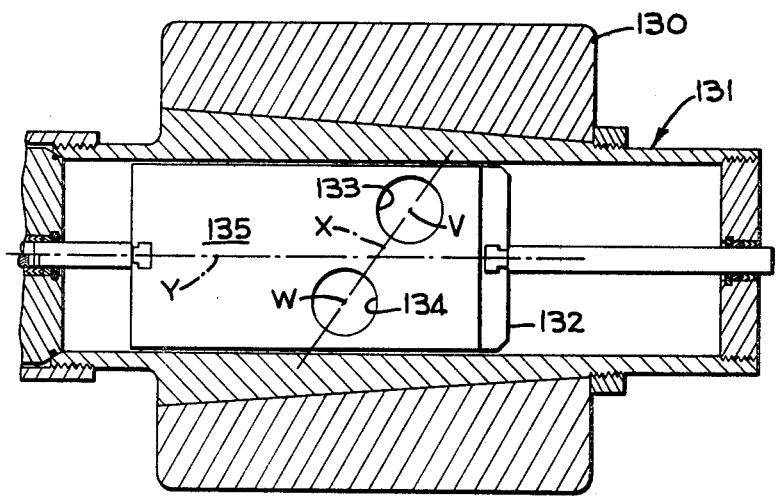
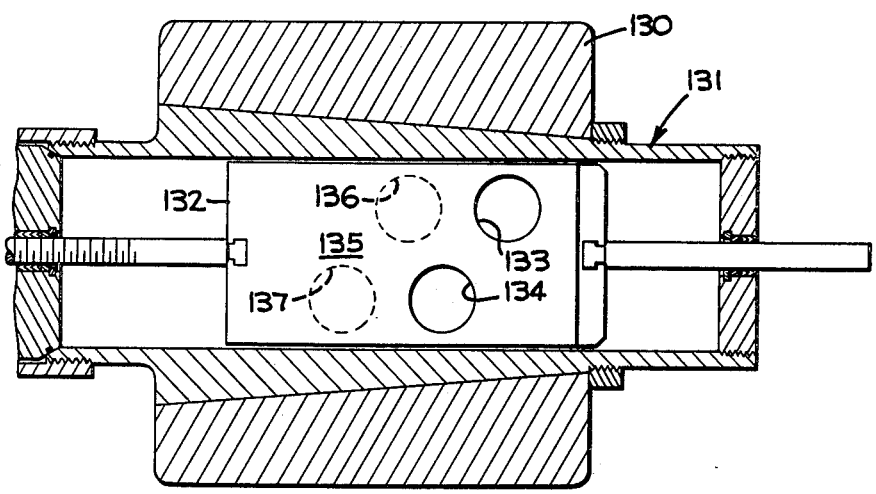

United States Patent Office 3,494,377
Patented Feb. 10, 1970

3,494,377
GATE VALVE MECHANISM FOR CONTROL OF PLURAL PASSAGES
Erik Thuse, San Jose, Calif., assignor to FMC Corporation, San Jose, Calif., a corporation of Delaware
Filed June 12, 1967, Ser. No. 645,295
Int. Cl. F16k *3/02, 3/314;* E21b *41/00*
U.S. Cl. 137—625.18
19 Claims

ABSTRACT OF THE DISCLOSURE

A gate valve with a plurality of parallel flow passages, and a multiple-orifice gate member for selectively opening and closing the passages in a predetermined sequence. The employment of the valve in an oil or gas well Christmas tree to control fluid flow through the tree's bores is described, as also are several variations in the number and position of the orifices in the gate member.

BACKGROUND OF THE INVENTION

The present invention relates to a gate valve mechanism particularly suitable for use in a Christmas tree at the head of an oil or gas well.

In a typical oil well, two or more tubing strings, which carry oil from a zone underground, terminate above ground at a Christmas tree having a plurality of passages in communication with the tubing strings. Valves in the Christmas tree passages control the flow of oil. Gate valves are used most frequently for this purpose because, despite the high pressure which may exist in the passages, the gate members thereof can be readily shifted without the application of undue force thereto.

It is necessary that elongated tools can pass through the hydraulic channels defined by the passages in the Christmas tree and the respective tubing strings with which they communicate so that necessary cleaning of, or working through, the tubing strings can be accomplished. The passages through the Christmas tree, and through the valves in the Christmas tree, must define straight bores to pass the tools which are slightly smaller in diameter than the tubing strings.

If the tools are to be lowered and raised by hydraulic pressure, which is commonly done in undersea wells, as noted, for example, in the article "Deep Water Completions Extend Technological Thresholds" in the November 1966 Petroleum Engineer, the two hydraulic channels, with a deep crossover port, define a hydraulic circuit into which pressure fluid is introduced. With this circuit, the tools can be pumped through the Christmas tree, into the tubing, and back out again as required. This is essential in the operation of remote Christmas trees, such as underwater Christmas trees. In pumping the tools in or out of the tubing strings, the two hydraulic channels must be opened simultaneously in order to initiate flow in the hydraulic circuit to actuate the tool. Conventional equipment requires the use of two separate valves actuated by separate operators in order to accomplish this result.

SUMMARY OF THE INVENTION

In the present invention, a gate valve mechanism is provided to control flow through two or more hydraulic channels. In brief, in the preferred form of the invention, a gate valve has a valve body with a plurality of parallel passages which, when connected, respectively, to tubing strings, define straight paths, or bores, through which cleaning and reworking tools can pass. A laterally shiftable gate member with a plurality of openings therethrough is received in the valve body to control the flow through the passages. The gate member, which is moved by actuating mechanism in a plane normal to the parallel passages, opens all the passages in one position of the gate member and closes all the passages in another position of the gate member. In the former position, the openings in the gate member, which are positioned in a pattern corresponding to the position of the passages, are in registration, respectively, with all the passages; in the latter position, landed areas of the gate member are in registration with the passages. Thus, a single actuation of the valve by a single operator can simultaneously open or close two strings of tubing and any doubt as to whether both passages are open at the same time is eliminated.

In some embodiments of the present invention, the gate member can be moved selectively to other positions to provide independent control of individual passages. This is accomplished by positioning two or more openings on a line passing through the axes of the passages and extending parallel to the direction of movement of the gate member. With this arrangement, each of the openings is shifted selectively into registration with two or more of the passages, to open said passages, while the landed area of the gate member blocks the other passage. It is thus possible, with a single gate member intersecting two passages, alternately to open both passages, close both passages, open one passage and close the other, or open said other passage and close said one passage.

Preferably, the valve is constructed for quick and easy insertion into or removal from a Christmas tree body as a unit.

It is therefore one object of the present invention to provide a gate valve with a single gate to control a plurality of passages. It is still another object of the present invention to control flow through a plurality of passages, with a single valve having a single movable valve member, wherein the flow in each passage is controlled independently of the flow in the other passages. It is yet another object of the present invention to provide a gate valve for simultaneously opening two strings of tubing in a well circuit. It is still another object of the present invention to provide a gate valve for opening or closing two or more flow channels with a single operation. It is another object of the present invention to provide a Christmas tree gate valve in two or more straight bores which can be opened to pass tools through the bores.

BRIEF DESCRIPTION OF THE DRAWINGS

FIGURE 1 is a view in perspective of a well head Christmas tree with a gate valve constructed in accordance with the present invention;

FIGURE 2 is an elevational view, with portions broken away, of the gate valve of FIGURE 1;

FIGURE 3 is a view taken on the line 3—3 of FIGURE 2;

FIGURE 4 is a view taken on the line 4—4 of FIGURE 2;

FIGURES 5 and 6 are views similar to FIGURE 4 except with the gate member of the valve in different positions;

FIGURE 7 is a elevational view of a Christmas tree body having two gate valves therein;

FIGURE 8 is a sectional view of a valve, showing a modified gate member in plan;

FIGURES 9 and 10 are sectional views of a valve, showing another modified gate member in plan in one and the opposite extreme positions;

FIGURE 11 is an elevational view, with portions broken away, of a valve with a modified gate member;

FIGURE 12 is a view taken on the line 12—12 of FIGURE 11; and

FIGURES 13 and 14 are sectional plan views of a valve showing another modified gate member in plan in one and the opposite extreme positions.

DESCRIPTION OF THE PREFERRED EMBODIMENTS

The illustration of FIGURE 1 shows a Christmas tree at the head of a land based oil well which has concentric casings (not shown) extending into the ground. The inner casing is received in a casing head 15 which has an upper flange 16 bolted to the lower flange 17 of a tubing head 18. The tubing head has a shoulder 19 on the inner wall thereof which supports a bushing 20 having a vertical passage 21a extending therethrough. A coupling 23, having a vertical pasage 22a extending therethrough, is received in a bore in the bushing. Passages 21a, 22a are threaded at the lower ends to threadedly receive the upper ends of two tubing strings 21b, 22b. The passages 21a and 22a through the bushing and coupling are also threaded at the upper ends to threadedly receive handling tools during installation or removal of the tubing strings.

A body 25 in the Christmas tree has a lower flange 26 bolted to the upper flange 27 of the tubing head. Two seal sleeves 24, having passages 21c, 22c extending, respectively, therethrough have their upper ends in the Christmas tree body and their lower ends in the bushing 20 and coupling 23, respectively. The body 25 has two parallel passages 21d, 22d therein which are aligned with and in communication with the passages 21c, 22c and the passages 21b, 22b. The body 25 has two protruding wing sections 28, 29, each of which has a passage 30, 31, respectively, extending therethrough. Each of the passages 30, 31, has one end connected to one of the body passages 21d, 22d, respectively. Valves 32, 33 are mounted in the wing sections 28, 29, respectively, and are connected into passages 30, 31, respectively, to control the flow of oil therethrough. The body passages 21d, 22d extend through the upper surface of the body where they are aligned with openings 21e, 22e in a cap 34 secured to the top of the body.

As shown in FIGURES 1, 2 and 3, a valve 40 is received in a tapered cavity 41 extending across the body 25 below the wing sections thereof. The valve has a body 42 which has two parallel passages 21f, 22f therein. The valve body is tapered to fit within the tapered cavity 41. A nut 43, threadedly engaged with the valve body 42, is tightened against the body 25 to hold the valve body 42 tightly in the Christmas tree body 25 with valve body passages 21f, 22f aligned with the body passages 21d, 22d, respectively. With the nut 43 removed, the portion of the valve 40, when fully assembled as a unit, which extends beyond the small diameter end of the tapered body, is of smaller diameter than any portion of the tapered cavity 41 so that the body 40 can be quickly and easily inserted in or removed from the Christmas tree as a unit.

The valve body 42 has bosses 44, 45 extending inwardly from the inner surfaces thereof through which the passages 21f, 22f extend. Two annular collars 46, which define valve seats, are received in the inner face of each of the bosses, 44, 45, each in registration with one of the passages in the valve body. Each seat has a flexible sealing ring 47a secured in the inner face thereof surrounding the valve body passage, and a flexible sealing ring 47b in the vertical wall of the seat. A flat gate member 48 is slidably received between the valve seats 46. Two stems 49, 50 (FIGURE 1) each have connectors 51 extending therefrom which are received in T slots 52 in the ends of the gate member 48.

A nose piece 53 has a seal 54 which slidably receives stem 49. The end flange 55 of the nose piece abuts against one end of the valve body 42 and is tightly held thereagainst by a nut 56. The nut 56 has threads 57 engaged with the valve body 42 and has a flange 58 which overlaps the flange 55 of nose piece 53 to hold the flange 55 tightly against the valve body when the nut is drawn up tight. A nut 59, having an inner flange 60, is received in the outboard end of nose piece 53 and is held therein by nut 61 which is threadedly received in the nose piece outboard of the nut flange 60. The nut 59, to which handwheel 62 is secured, is engaged with the threads 63 on stem 49. A stem casing 64 attaches tightly to nut 59 and the handwheel hub is loosely attached to the nut by means of a pin for purpose of applying torque. At the opposite end of the valve, the valve body 42 threadedly receives an end plate 65 which has a seal 66 to slidably receive stem 50 of gate member 48. As the handwheel 62 is turned in one direction or the other, the gate member is shifted in one direction or the other in the valve body 42.

It will be noted (see FIGURE 1) that two parallel straight passages or bores, indicated generally at 21 and 22, are defined by the tubing strings 21b and 22b, the passages 21a, 22a, the passages 21c, 22c, the passages 21d, 22d, the openings 21e, 22e, and the passages 21f, 22f. These two passages 21, 22 which define hydraulic channels extending from deep in the well, where they are connected, to the top of the Christmas tree, are intercepted by the gate member 48 which moves laterally in a plane normal to the passages 21 and 22. The gate member 48 has two openings 21g and 22g extending therethrough. When the gate member 48 is shifted by handwheel 62 to the position shown in FIGURES 1 and 2, the openings 21g and 22g will be aligned with passages 21f and 22f in the valve body.

During normal operation of the well, valves 32, 33 and 40 are open. Oil flows from a zone in the ground up through passage 21, through valve 40, and out through passage 30 and the valve 32 therein to a processing facility. Oil may also flow from the same zone in the ground up through passage 22, through valve 40, and out through passage 31 and the valve 33 therein to the processing facility. The upper ends of both passages 21 and 22, above the junction of passages 30, 31, will be blocked by a fitting 70 which threadedly receives a cap 71 with a plug 72 therein.

The two passages 21 and 22 must be straight because occasionally a tool, such as the tool 73, which is slightly smaller in diameter than the tubing strings 21b, 22b, must be lowered, as by rod 74, into a tubing string to take a test at the bottom of the tubing string or perform work functions such as scrape the paraffin from the walls thereof. When this is necessary, in either or both of the tubing strings, the cap 71 is replaced by a fitting 75 which receives the tool 73 and actuating rod 74 therefor. The tool may also be actuated by the application of pressure to the hydraulic circuit defined by the connected passages 21, 22. Application of pressure above the tool in the passage containing the tool will lower the tool; application of pressure to the other passage will raise the tool. When tools are used, the valves 32 and 33 will both be closed, and the valve 40 will be opened with both openings 21g and 22g in registration with the passages 21 and 22 so that a straight, unobstructed bore is provided through which the tools can pass down into the tubing strings.

The single gate valve 40 is installed in both passages 21 and 22. With caps 71 installed at the upper ends of both passages 21, 22, and valves 32 and 33 open, the single gate member 48 of valve 40 will control the flow in both passages 21, 22. One end of the gate member 48 has the openings 21g and 22g and the other end of the gate member has landed area 80. As shown in FIGURES 1, 2 and 4, the gate member 48 opens both passages 21 and 22 when the gate member is in one extreme position (the left as viewed in FIGURE 4) with the openings 21g and 22g in registration with the passages 21 and 22. As shown in FIGURE 6, the gate member 48 closes both passages 21 and 22 when the gate member is in the other extreme position (the right as viewed in FIGURE 6) with the landed area 80 in registration with both passages 21 and 22. Thus, the two strings of tubing 21b, 22b can be opened or closed simultaneously, by a single operator performing a single operation, without leaving any doubt as to whether both passages are opened or closed at the same time.

The passages 21 and 22, which are of circular cross-section, have longitudinal central axes A and B intersecting a straight line C lying on the gate member 48. The gate member 48 lies in a plane P (see FIGURE 3) which is normal to the axes A and B. The central axes D and E of the openings 21f and 22f in gate member 48, which are of circular cross-section and of the same diameter as the passages 21 and 22, intersect line C (FIGURE 4). The gate member 48 is reversibly movable linearly in plane P in a direction, indicated by arrow F, parallel to the direction of line C. The axis A of passage 21 is spaced a distance G from the axis B of passage 22, and the axis D of opening 21g is spaced the same distance G from the axis E of opening 22g. With tubing strings of 2⅞ inches outer diameter, the distance G might, for example, be 4 inches.

Since both openings 21g and 22g lie on a common line C which intersects the longitudinal axes of the passages, and since the gate member 48 is shiftable linearly in a direction parallel to the line C, the gate member can exert individual control over the separate passages. For example, as shown in FIGURE 5, the gate member 48 can be shifted to an intermediate position where opening 21g is in registration with passage 22 and the landed area 80 is in registration with passage 21. Thus, passage 21 will be closed and passage 22 open. The valve 40, however, with gate member 48, will not open passage 21 while passage 22 is closed.

To obtain full individual control over both passages 21, 22 so that any combination of opening and closing of the two passages can be achieved, two valves 40 are used, as shown in FIGURE 7. A Christmas tree member 81 has two closely spaced parallel passages 82, 83 therein. One valve 40 is inserted in the member 81 to intersect both passages and is oriented in one direction. A second valve 40 is inserted in the member 81 to intersect both passages and is oriented in the opposite direction to the other valve 40. To avoid interference, the two valves 40 are vertically spaced apart. The upper valve 40 in FIGURE 7 can alternately: open both passages 82, 83; close passage 82 and open passage 83; and close both passages. The lower valve 40 in FIGURE 7 can alternately: open both passages 82, 83; close passage 83 and open passage 82; and close both passages. The upper valve 40 in FIGURE 7 cooperates with the passages 82, 83 in the same manner the valve 40 cooperates with the passages 21, 22 as shown in FIGURES 4, 5 and 6. The lower valve 40 in FIGURE 7 cooperates with the passages 82 and 83 in the same manner as the upper valve 40 of FIGURE 7 except that it cooperates oppositely with respect to the passages 82, 83 because the valve is oppositely oriented.

Full control of two passages, with all possible combination of opening and closing each of the two passages independently of the other passage, can be achieved with the valve of FIGURE 8. This valve 85, which is similar to the valve 40 except for the length of the gate member 86, valve body, stems, and stem casing, can be inserted into the Christmas tree member 25 of FIGURE 1 in place of the valve 40 thereof. The gate member 86 has two openings 87 and 88 lying on a common line H. The two openings 87 and 88 are positioned centrally in the gate member, with landed areas 89 and 90 at both ends of the gate member. Except for the fact that there is landed area at both ends of the gate member 86, instead of at only one end as in gate member 48, the relationship of the openings to the passages is the same as in valve 40. Similarly, the line H intersects axes A and B, and the gate member 86 is reversibly movable parallel to line H.

In the extreme right hand position (as viewed in FIGURE 8) of the gate member 86, the landed area 89 blocks both passages 21 and 22. When the gate member is shifted to the left to a position where opening 87 is in registration with passage 22, the landed area 89 will still block passage 21. Thus, in this position of gate member 86, passage 21 will be closed and passage 22 will be open. When the gate member is shifted further to the left, to a center position, the openings 87 and 88 will be in registration with the passages 21 and 22 so that both passages will be open. When the gate member 86 is shifted further to the left to a position where opening 88 is in registration with passage 21, the passage 22 will be blocked by landed area 90. Thus, in this position of the valve, which is shown in FIGURE 8, passage 21 will be open and passage 22 will be blocked, or closed. In the extreme left hand position of the gate member, both passages 21 and 22 will be blocked by landed area 90 of the gate member. It should be noted that, from a center position, the gate member 86 need be moved in one direction or the other only the distance G to close one or the other of the passages 21 or 22. With one or the other passages closed, the gate member 86 need be moved only a distance G to close both passages.

Three passages can be controlled by a single valve with a single valve member, as shown in FIGURES 9 and 10. A Christmas tree member 95 receives a valve 96 which is constructed similarly to the valve 40 except that the gate member 97 has three openings 98, 99, 100 at one end and a landed area 101 at the other end. The Christmas tree member 95 has three passages 102, 103, and 104 therein. The pattern of the openings 98, 99, 100 corresponds to the pattern, or array, of the passages 102, 103, 104. In one extreme position of the gate member 97, as shown in FIGURE 9, the three openings 98, 99, 100 are in registration with the three passages 102, 103 and 104, and the three passages are open. In the other extreme position of the gate member, as shown in FIGURE 10, the landed area 101 is in registration with the three passages 102, 103 and 104 and the three passages are closed.

More versatile control of three passages is possible with the gate valve of FIGURES 11 and 12. A valve 110 which is similar in all respects to the valve 96 of FIGURES 9 and 10 except for the gate member, may be inserted in a Christmas tree member 111 as valve 96 is inserted in Christmas tree member 95. The Christmas tree member 111 has three straight closely spaced parallel passages 112, 113, 114. The three passages are of circular cross-section and have central longitudinal axes J, K and L, respectively. The three axes J, K, L pass through the apexes of an equilateral triangle, indicated at T, with sides of length S as shown in FIGURE 12. The gate member 115 of valve 110 has three centrally positioned openings 116, 117, 118 (of diameter less than S) which are in registration with passages 112, 113, 114, respectively, when the gate member 115 is centrally positioned. The gate member has landed areas 119, 120 at the opposite ends, respectively, of the gate member 115. A fourth opening 121 is located in the landed area 120 spaced from the other three openings.

The two openings 116 and 118 lie on a common imaginary line M on gate member 115 and the two openings 117 and 121 lie a distance 2S apart on a common imaginary line N parallel to line M. The lines M and N are parallel to the direction of movement, indicated by arrow O, of gate member 115. The line M, in any position of the gate member 115, intersects axes J and L of passages 116, 118 and the line N, in any position of gate member 115, intersects axis K.

With gate member 115 centered as shown in FIGURES 11 and 12, the openings 116, 117 and 118 are in registration with the passages 112, 113 and 114 to open all three passages. With gate member 115 in the extreme right hand position (as viewed in FIGURE 12) the landed area 119 is in registration with the three passages 112, 113, 114 and the three passages are blocked, or closed. When the gate member is shifted to the left from the extreme right hand position to a position where opening 116 is in registration with passage 114, the passages 112 and 113 will be blocked by the landed area 119 of gate member 115. When the gate member 115 is in the extreme left hand position (as viewed in FIGURE 12), the passage 113 is in registration with opening 121 to open passage 113. At this time, passages 112 and 114 are blocked by landed area 120 of the gate member to close those passages. When the gate member 115 is shifted to the right from the extreme left hand position, to a position where the opening 118 is in registration with passage 112, the landed area 120 will block passages 113 and 114. Thus, the cooperation of gate member 115 with passages 112, 113 and 114, can be summarized as follows:

movement therein and in which at least two of said passages and at least two of said openings have axes which intersect a common line parallel to the direction of said linear movement, said valve having means to shift the gate member alternately to block both passages, to align one opening with one passage and to block the other opening, and to align both openings with said passages.

2. The gate valve of claim 1 in which said two passages and said two openings are of circular cross-section having centers lying on said axes.

3. A Christmas tree valve for a Christmas tree comprising a valve body having two passages therein, a gate member slidably received in said valve body to intersect said passages, said gate member having two openings

| Position of Gate Member 115 | Passage 112 | Passage 113 | Passage 114 |
| --- | --- | --- | --- |
| Extreme Right | Closed by Land 119 | Closed by Land 119 | Closed by Land 119. |
| Intermediate Right | do | do | Open through Opening 116 |
| Center | Open through Opening 116. | Open through Opening 117. | Open through Opening 118. |
| Intermediate Left | Open through Opening 118. | Closed by Land 120 | Closed by Land 120. |
| Extreme Left | Closed by Land 120 | Open through Opening 121. | Do. |

The Christmas tree 130 shown in FIGURES 13 and 14, and the valve 131 shown therein, are similar to the Christmas tree 95 and valve 96 thereof except for the position of the Christmas tree passages and the position of the openings in the gate member of the valve. The valve 131 has a gate member 132 with two openings 133, 134 therein, and a landed area 135 adjacent the openings. The Christmas tree body has two passages 136, 137 therein with central longitudinal axes V and W which intersect an imaginary diagonal line X. The gate member 132 moves parallel to an imaginary line Y on the gate member. The two openings 133, 134 lie on line X on either side of the line Y when the gate member is in the position shown in FIGURE 13. Each opening in gate member 132 is associated with one passage in Christmas tree 130 (opening 133 with passage 136; opening 134 with passage 137) and when the gate member 132 is moved from the position shown in FIGURE 13 toward the position shown in FIGURE 14, the openings move in parallel paths, which do not overlap, so that neither opening encounters another passage other than the one with which it is associated. Thus, when the gate member 132 is moved from the position shown in FIGURE 13, where the openings 133, 134 are in registration, respectively, with passages 136, 137 to open the passages, toward the position shown in FIGURE 14, the passages will be completely closed by the landed area 135 as soon as the gate member has moved a distance corresponding to the diameter of the largest passage. If both passages, and both openings have the same diameter (as in the mechanism of FIGURES 13 and 14), the passages will close simultaneously as the gate member approaches the position shown in FIGURE 14. Positioning the passages on a diagonal line permits the use of a valve 131 of smaller diameter than if the line X were perpendicular to the direction of gate member movement.

Having completed a detailed description of the invention so that those skilled in the art could practice the same, I claim:

1. A gate valve having a valve body, said valve body having a plurality of passages and having a movable gate member intersecting said passages, said movable gate member having a plurality of openings extending therethrough, said movable gate member shiftable of selective registration of the openings therein with said passages to selectively open and close said passages, said gate member being slidably received in the valve body for linear extending therethrough for simultaneous registration with said two passages, respectively, when said valve member is in a first predetermined position, said gate member shiftable in one directional sense to a second predetermined position to block one of said passages and to shift one of said openings from registration with one of said passages into registration with the other of said passages, said gate member shiftable further in said one directional sense to a third predetermined position to block both of said passages, and means to shift said gate member.

4. A Christmas tree gate valve comprising a valve body having a first passage and a second passage therein, a gate member received in said body to intersect said passages, said gate member linearly movable with respect to said passages and having two openings for simultaneous registration with said first and second passages, respectively, when said valve member is in a first predetermined position, said gate member having landed areas adjacent both of said openings, said gate member shiftable in one directional sense from said first position to a second predetermined position and shiftable in the opposite directional sense from said first position to a third predetermined position, one of said landed areas in registration with said first passage to block said first passage and said first opening in registration with said second passage to open said second passage when the gate member is shifted to said second predetermined position, the other of said landed areas in registration with said second passage to block said second passage and said second opening in registration with said first passage to open said first passage when the gate member is shifted to said third predetermined position, and means to shift said gate member.

5. The valve of claim 4 in which said gate member is shiftable in said one directional sense beyond said second predetermined position to a fourth predetermined position, said one landed area in registration with said first and second passages to block said passages simultaneously when said gate member is in said fourth predetermined position.

6. The valve of claim 5 in which said gate member is shiftable in said opposite directional sense beyond said third predetermined position to a fifth predetermined position, said outer landed area in registration with said first and second passages to block said passages simultaneously when said gate member is in said fifth predetermined position.

7. In a Christmas tree having two parallel passages therein comprising a first passage and a second passage, a first movable valve member, said first movable valve member having a first opening and a second opening extending therethrough, said first and second openings of said first movable valve member in registration with said first and second passages, respectively, to open said passages when said first movable valve member is in a first predetermined position, said first movable valve member shiftable in one directional sense to a second predetermined position, said first movable valve member blocking said first passage and said first opening in registration with said second passage to open said passage when said first movable valve member is in said second predetermined position, said first movable valve member shiftable in said one directional sense beyond said second predetermined position to a third predetermined position, said first movable valve member blocking said first and second passages in said third predetermined position, a second movable valve member, said second movable valve member having a first opening and a second opening extending therethrough, said first and second openings of said second movable valve member in registration with said first and second passages, respectively when said second movable valve is in a first predetermined position, said second movable valve member shiftable in the directional sense opposite to said one directional sense to a second predetermined position, said second movable valve member blocking said second passage and said second opening in registration with said first passage when said second movable valve member is in said second predetermined position, and means to independently shift said movable valve members.

8. The apparatus of claim 7 in which said second movable valve member is shiftable in the directional sense opposite to said one directional sense beyond said second predetermined position to a third predetermined position, said second movable valve member blocking said first and second passages in said third predetermined position.

9. A Christmas tree valve comprising a valve body having a first passage, a second passage, and a third passage, a gate member received in said valve body to intersect said passages, said gate member movable in the valve body and having a first opening, a second opening, a third opening, and a fourth opening therein, said gate member movable between a first predetermined position, a second predetermined position, a third predetermined position, a fourth predetermined position, and a fifth predetermined position, said gate member blocking said first, second, and third passages when in one of said predetermined positions, said gate member having one opening in registration with said first passage to open said passage and blocking said second and third passages when said gate member is in said second predetermined position, said gate member having one opening in registration with said second passage to open said passage and blocking said first and third passages when said gate member is in said third predetermined position, said gate member having one opening in registration with said third passage and blocking said first and second passages when said gate member is in said fourth predetermined position, said gate member having three openings in registration with said three passages when said gate member is in said fifth predetermined position.

10. The valve of claim 9 in which two of said passages have central longitudinal axes intersecting a first imaginary line on the gate member parallel to the direction of movement of said gate member and in which the other passage has a central longitudinal axis intersecting a secondary imaginary line on the gate member parallel to the direction of movement of said gate member, two of said openings in the gate member lying on said first line and two of said openings in the gate member lying on the second line.

11. In combination with a Christmas tree having at least three flow passages, a gate valve having a valve body, said valve body having at least three passages in registration with at least three of said tree flow passages, said valve body also having a movable gate member slidably received therein, said gate member movable in a plane normal to said passages and having at least three openings therein, said openings positioned in a pattern in the gate member to correspond to the pattern of the passages in the valve body, said gate member having a landed area and shiftable to one position where the landed area is in registration with said passages to block the passages and shiftable to another position where the three openings are in registration with the three passages to open said passages.

12. A Christmas tree comprising a body having an opening therein, said body having two passages interrupted by said opening, a valve body received in said opening, said valve body having two passages therein for registration with the Christmas tree passages, a gate member slidably received in said valve body to intersect the passages therein, said gate member having two openings extending therethrough for simultaneous registration with the two valve body passages, respectively, when said gate member is in a first predetermined position, said gate member having a landed area to block simultaneously both valve body passages when said gate member is in a second predetermined position, at least one end of the valve being smaller than said opening to permit inserting the valve as a unit in and removing the valve as a unit from said opening in the Christmas tree.

13. In combination with a Christmas tree having a plurality of flow passages, a gate valve having a valve body, said valve body having at least two passages in registration with at least two of said tree flow passages, said valve body also having a movable gate member intersecting said passages, said movable gate member having at least two openings extending therethrough for simultaneous registration, respectively, with said valve body passages in one position of the gate member, said gate member having a landed area for simultaneously blocking said valve body passages in another position of the gate member, and means to shift said gate member from said one to said other position to simultaneously control the two passages with a single actuation of the gate valve member.

14. A Christmas tree comprising a body having two straight passages therein, a valve received in the Christmas tree body, said valve having a body with two straight passages aligned with the Christmas tree passages, a gate member slidably received in said valve body to intersect the passages therein, said gate member having two openings extending therethrough for simultaneous registration with the two valve body passages, respectively, when said gate member is in a predetermined position, said Christmas tree passages, valve body passages, and gate member openings defining two straight unobstructed bores to pass tools received therein.

15. In combination with a Christmas tree having a plurality of flow passages, a gate valve having a valve body, said valve body having a plurality of passages in registration with a plurality of said tree flow passages, said valve body also having a gate member slidably received therein to intersect said passages, said gate member having openings extending therethrough and having a landed area adjacent the openings, each opening in the gate member in registration with one passage in the valve body when the gate member is in a first predetermined position to open all said passages, said gate member shiftable along a line to move the openings in parallel spaced apart paths without overlap whereby landed area moves into registration with said passages to block said passages when said the gate member has moved a distance corresponding to the diameter of the largest of said passages.

16. In combination with a Christmas tree having a plurality of flow passages, a gate valve with a movable gate member intersecting at least two of said passages, said gate member having a plurality of openings extending therethrough for selective registration with said intersected passages, said gate member being shiftable between at least two positions, said intersected passages being blocked when said gate member is in one of said positions and being in registration with an equivalent number of said openings when said gate member is in another of said positions.

17. The combination of claim 16 wherein said intersected passages and said openings are equal in number.

18. The combination of claim 16 wherein the number of said openings exceeds the number of said intersected passages.

19. The combination of claim 16 including a third position wherein at least one of said passages is blocked by said gate member and at least another of said passages is in registration with an opening of said gate member.

References Cited

UNITED STATES PATENTS

| | | | |
|---|---|---|---|
| 2,858,851 | 11/1959 | Holl | 137—625.18 |
| 2,950,737 | 8/1960 | Hendrix | 137—625.48 |
| 3,078,921 | 2/1963 | Edwards | 166—89 X |
| 3,185,505 | 5/1965 | Lanmon | 166—89 X |

M. CARY NELSON, Primary Examiner

WILLIAM R. CLINE, Assistant Examiner

U.S. Cl. X.R.

251—329

PO-1050
(5/69)

UNITED STATES PATENT OFFICE
CERTIFICATE OF CORRECTION

Patent No. 3,494,377     Dated February 10, 1970

Inventor(s) E. THUSE

It is certified that error appears in the above-identified patent and that said Letters Patent are hereby corrected as shown below:

Column 7, line 72, change "of" to --for--. Column 9, line 68, change "condary" to --cond--. Column 10, line 69, delete "said".

Signed and sealed this 6th day of July 1971.

(SEAL)
Attest:

EDWARD M. FLETCHER, JR.
Attesting Officer

WILLIAM E. SCHUYLER, JR.
Commissioner of Patents